United States Patent
Rajagopalan et al.

(10) Patent No.: US 10,299,355 B2
(45) Date of Patent: May 21, 2019

(54) INTELLIGENT GATING MECHANISM

(71) Applicant: SIGNIFY HOLDING B.V., Eindhoven (NL)

(72) Inventors: Ruben Rajagopalan, Neuss (DE); Harry Broers, S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/773,579

(22) PCT Filed: Oct. 24, 2016

(86) PCT No.: PCT/EP2016/075568
§ 371 (c)(1),
(2) Date: May 4, 2018

(87) PCT Pub. No.: WO2017/076680
PCT Pub. Date: May 11, 2017

(65) Prior Publication Data
US 2018/0332691 A1 Nov. 15, 2018

Related U.S. Application Data

(60) Provisional application No. 62/250,834, filed on Nov. 4, 2015.

(51) Int. Cl.
*H04L 29/08* (2006.01)
*H05B 37/02* (2006.01)

(52) U.S. Cl.
CPC ......... *H05B 37/0272* (2013.01); *H04L 67/34* (2013.01); *H05B 37/0218* (2013.01); *H05B 37/0227* (2013.01); *Y02B 20/48* (2013.01)

(58) Field of Classification Search
CPC ............ H05B 37/0272; H05B 37/0218; H05B 37/0227; H04L 67/34
See application file for complete search history.

(56) References Cited

U.S. PATENT DOCUMENTS

2013/0346229 A1* 12/2013 Martin ................... G06Q 40/00
705/26.3
2014/0293993 A1 10/2014 Ryhorchuk
(Continued)

FOREIGN PATENT DOCUMENTS

WO 2011121470 A1 10/2011
WO 2012143814 A1 10/2012
(Continued)

*Primary Examiner* — Dedei K Hammond
*Assistant Examiner* — Raymond R Chai
(74) *Attorney, Agent, or Firm* — Meenakshy Chakravorty

(57) ABSTRACT

A gating module for use in a lighting system comprising at least one sensor module each comprising at least one sensor and a lighting network comprising at least one luminaire, the gating module configured to: receive sensor data obtained by the at least one sensor module; receive an input signal; determine based on the input signal and predetermined rules stored in a memory which parts of the sensor data are to be supplied to at least one luminaire controller for use in controlling the at least one luminaire; and only supply the determined parts of the sensor data to the at least one luminaire controller.

14 Claims, 4 Drawing Sheets

(56) References Cited

U.S. PATENT DOCUMENTS

2015/0147067 A1* 5/2015 Ryan .................... H04B 10/116
                                                          398/118
2017/0038753 A1   2/2017 Shah et al.
2017/0127495 A1* 5/2017 Mohan ............... H05B 37/0227

FOREIGN PATENT DOCUMENTS

| WO | 2013080090 A1 | 6/2013 |
| WO | 2014016729 A1 | 1/2014 |
| WO | 2014060903 A1 | 4/2014 |
| WO | 2014184009 A1 | 11/2014 |
| WO | 2015022157 A1 | 2/2015 |

* cited by examiner

INTELLIGENT GATING MECHANISM

CROSS-REFERENCE TO PRIOR APPLICATIONS

This application is the U.S. National Phase application under 35 U.S.C. § 371 of International Application No. PCT/EP2016/075568, filed on Oct. 24, 2016, which claims the benefit of U.S. Patent Application No. 62/250,834 filed on Nov. 14, 2015. These applications are hereby incorporated by reference herein.

TECHNICAL FIELD

The present disclosure relates to the transmission of sensor data between a user terminal and a lighting network. In particular the present disclosure relates to a gating module for control of the exchange of sensor data.

BACKGROUND

With the many advances in the Internet-of-Things (IoT) domain, and the digital revolution within the Lighting domain, there is an increasing need for having a wide variety of sensing functionalities within smart lighting installations. There is also a strong need for sensor-driven light control systems, owing to the advantages there provide in reducing the energy consumed by light sources, and the resulting improved cost-savings and longer life-span of the light sources.

Trends observed in Smart Spaces (Urban, Offices, Homes, etc.) indicate that a higher degree of intelligence in the future will be realized with interconnected sensors and borrowing/reuse of sensor information from external infrastructure platforms (distributed/wireless sensor networks as in a mobile device for instance) that will continuously broadcast their sensor data.

Current floating sensor platforms (mobile devices like smartphones for instance) have a multitude of sensors in them that can typically broadcast their data externally (e.g. to the cloud or $3^{rd}$ party systems) unconditionally.

As the number of such floating mobile sensor networks increases manifold, and also the diversity of sensors within such platforms, the amount of sensor data available from external systems for reuse will increase tremendously. Handling such large amounts of data with varying levels of accuracy will be a challenging task for lighting networks.

SUMMARY

The inventors have identified problems with the continual broadcast of sensor data to an external system. In particular, the inventors have identified that the continual broadcast of sensor data is an energy-inefficient approach as most often the external system is either not in need of the specific sensor information or the quality of the sensor information is not reliable enough to suit its needs.

The present invention addresses both of these shortcomings for applications that rely on the information exchange between IoT devices and a lighting network, with the help of a smart gating mechanism to ensure that IoT devices send out sensor information only when needed/reliable and the lighting network appropriately initiates/accepts the sensor information exchange.

According to another aspect of the present invention, there is provided a gating module for use in a lighting system comprising at least one sensor module, each comprising at least one sensor and a lighting network comprising at least one luminaire, the gating module configured to: receive sensor data obtained by the at least one sensor module; receive an input signal; determine based on the input signal and predetermined rules stored in a memory, which parts of the sensor data are to be supplied to at least one luminaire controller for use in controlling the at least one luminaire; and only supply the determined parts of the sensor data to the at least one luminaire controller.

The input signal may comprise at least one characteristic of light detected by a sensor of the at least one sensor module, and the predetermined rules may define which parts of the sensor data should only be transmitted to the luminaire controller when predetermined light characteristics are detected by said at least one sensor module.

The at least one light characteristic may comprise one or more of: an intensity of light detected by the sensor, and the predetermined rules define sensor data should only be transmitted to the luminaire controller when the detected intensity is within a predetermined threshold intensity range; and an identifier decoded by the sensor from light received by said sensor, and the predetermined rules define sensor data should only be transmitted to the luminaire controller when the sensor detects light having a predetermined identifier embedded into it.

The input signal may be indicative of an environmental condition of an environment of a device on which a sensor module of the at least one sensor module is implemented, and the predetermined rules define sensor data received from said sensor module should only be transmitted to the luminaire controller when sensed values of the environmental condition are within a predetermined threshold range.

The input signal may comprise an indication as to whether a power supply of a device on which a sensor module of the at least one sensor module is implemented is in a charging state, and the predetermined rules define sensor data received from said sensor module should only be transmitted to the luminaire controller when the power supply of the device is in a charging state.

The input signal may comprise an indication of a location of a device on which a sensor module of the at least one sensor module is implemented, and the predetermined rules define sensor data received from said sensor module should only be transmitted to the luminaire controller when the device is within a predetermined distance of the at least one luminaire, the gating module configured to perform said determination using known location information of the at least one light source.

The input signal may indicate an orientation of a device on which a sensor module of the at least one sensor module is implemented, and the predetermined rules may define sensor data received from said sensor module should only be transmitted to the luminaire controller when the device is positioned in a predetermined orientation. The gating module may be implemented on a luminaire of the at least one luminaire, the luminaire comprising the luminaire controller and the at least one light source, and the gating module is configured to receive the sensor data via an interface of said luminaire. Alternatively, the gating module and luminaire controller may be implemented on a network entity connected within said lighting network, and the gating module is configured to receive the sensor data via an interface of said network entity, for use in controlling the light emitted by the at least one luminaire coupled to the network entity.

The gating module may receive a type of sensor data from a plurality of sensor modules, the gating module may be further configured to: detect that the supply of the determined parts of the sensor data to the at least one luminaire controller has exceeded a predetermined bandwidth threshold; and in response to said detection, only supply the type of sensor data that is received from a subset of the plurality of sensor modules.

The gating module may be implemented on a user terminal comprising the at least one sensor module, and may be configured to supply the sensor data to the luminaire controller that is connected within said lighting network, over a connection via an interface of said user terminal.

The predetermined rules may define sensor data should only be transmitted to the luminaire controller upon reception of an input signal comprising an indication that a motion sensor on the at least one luminaire has not detected movement in a sensing region of the motion sensor for a predetermined period following motion detection, and the gating module is configured to perform said determination upon reception of said input signal.

In response to determining that sensor data output from one or more sensor of the at least one sensor module is not to be supplied to the luminaire controller, the gating module may be configured to control operation of the one or more sensor.

According to another aspect of the present invention there is provided a method performed by gating module implemented in a lighting system comprising at least one sensor module each comprising at least one sensor and a lighting network comprising at least one luminaire, the method comprising: receiving sensor data obtained by the at least one sensor module; receiving an input signal; determining based on the input signal and predetermined rules stored in a memory which parts of the sensor data are to be supplied to at least one luminaire controller for use in controlling the at least one luminaire; and only supplying the determined parts of the sensor data to the at least one luminaire controller.

According to another aspect of the present invention there is provided a computer program product for controlling transmission of sensor data to a lighting network comprising at least one luminaire, the computer program product comprising code embodied on a computer-readable medium and being configured so as when executed on a processor to: receive sensor data obtained by at least one sensor module; receive an input signal; determine based on the input signal and predetermined rules stored in a memory which parts of the sensor data are to be supplied to at least one luminaire controller for use in controlling the at least one luminaire; and only supply the determined parts of the sensor data to the at least one luminaire controller.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Embodiments will now be described by way of example only.

Figure 1:
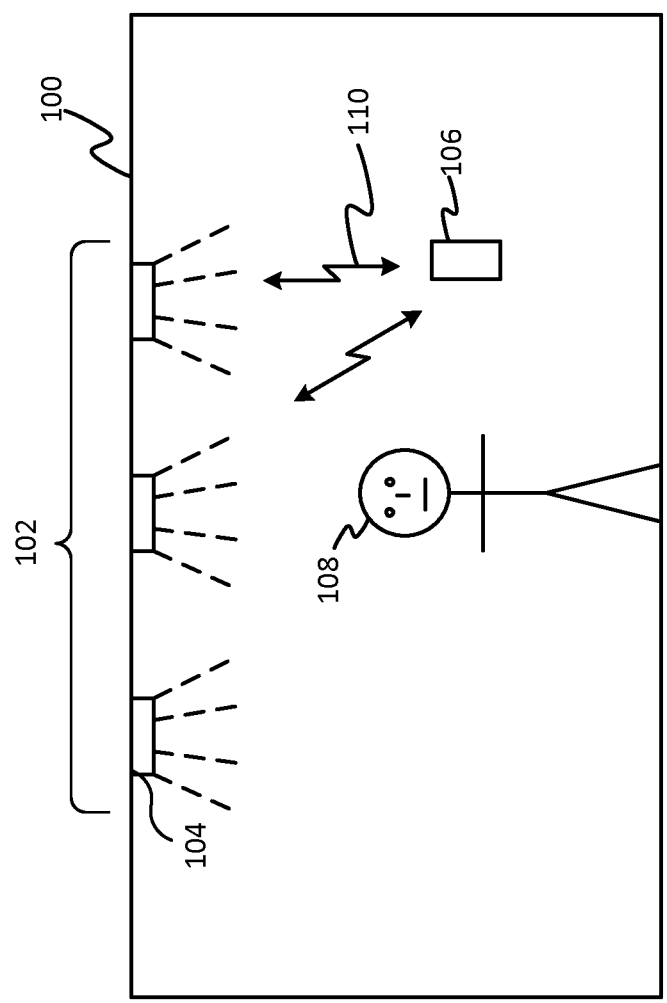
FIG. 1 illustrates a schematic block diagram of a lighting system.

Reference is first made to FIG. 1 which illustrates an example of a lighting system comprising a lighting network 102 and a user terminal 106. The lighting network 102 is installed in an environment 100 which may comprise an indoor space such as a room or building, and/or an outdoor space such as a garden or park, and/or a partially-covered environment such as a gazebo or stadium, and/or any other type of environment such as the interior of a vehicle. The lighting network 102 comprises at least one luminaire 104, which is a device for emitting illumination for illuminating the environment 100, comprising at least one light source such as an LED, an LED string or array, a gas discharge lamp or a filament bulb, plus any associated socket, housing and/or support.

The luminaires 104 are shown in FIG. 1 as being installed at fixed locations within the environment 100, e.g. in the ceiling and/or walls, and/or on light poles fixed to the floor or ground. However it will be appreciated that one or more of the luminaires may be portable. The number of luminaires 104 in the lighting network 104 shown in FIG. 1 is merely an example.

The user terminal 106 is associated with a user 108 and may for example be a mobile phone, a personal digital assistant ("PDA"), a personal computer ("PC"), a tablet computer, a television, a gaming device or any other embedded device able to communicate with the lighting network 102. The user terminal 110 is able to transmit data to, and receive data from, the lighting network 102

In the embodiment illustrated in FIG. 1, the communication between the user terminal 106 and the lighting network 102 is implemented via a direct connection 110, which in this context means without the involvement of an intermediate control device of the lighting system such as a lighting bridge. This connection 110 between the user terminal 106 and the luminaire(s) 104 may comprise a wired connection, e.g. via an Ethernet or DMX network; and/or a wireless connection, e.g. via a short-range RF technology such as Wi-Fi, ZigBee or Bluetooth. For instance, in the case of Wi-Fi, the connection 110 may be via a local Wi-Fi network and hence via a Wi-Fi router disposed in the environment 100 (not shown); or in the case of ZigBee or Bluetooth, the connection 110 may not involve any intermediate router, and may instead for example be based on a mesh network or ad-hoc connection with the luminaire(s) 104.

In other embodiments the lighting system does comprises a central control device (not shown in FIG. 1) via which the communication is implemented. In the case of a lighting network, this may be referred to as a lighting bridge or just the bridge (without necessarily imply any other limitations that may be associated with the term bridge in the context of other types of network). In this case, in order to communicate with the lighting network 102, the user terminal 106 sends signals to the bridge over a first connection, and the bridge sends corresponding signals to the luminaire(s) 104 over one or more second connections. The luminaire(s) 104 may optionally also send signals back to the bridge over the second connection(s), and the bridge may send corresponding signals back to the user terminal 110 over the first connection. The first and second connections may take the same form or different forms, and each may take any of the forms discussed in relation to the direct connection 110 in FIG. 1.

The communication channel between the user terminal 106 and the lighting network 102 allows for sensor data obtained at the user terminal 106 to be transmitted to the luminaire(s) 104 for controlling the luminaire(s) 104.

This sensor data may not be reliable enough for use by the lighting network 102 to control the luminaire(s) 104 if the user terminal 106 is situated in the environment 100 such that reliable sensor data cannot be obtained. For example, temperature data obtained by a temperature sensor on the user terminal 106 when the user terminal 106 is situated in a pocket of the user 108 (e.g. close to his body) or when the user terminal 106 is kept in the user's bag held on their person is likely to provide a false indication of the actual temperature in the environment 100.

Embodiments of the present disclosure prevent such unreliable sensor data from being used to control the luminaire(s) 104 of the lighting network 102.

Figure 2:
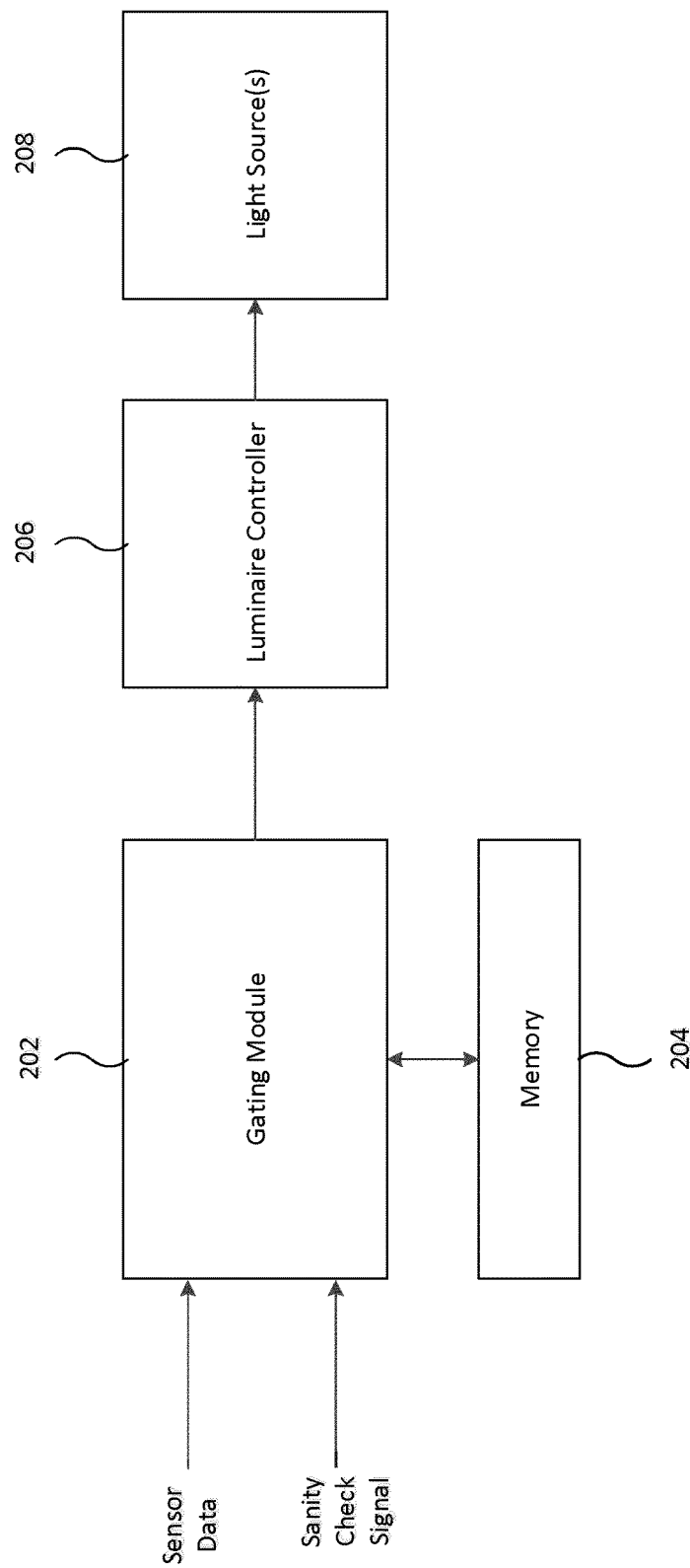
FIG. 2 illustrates a schematic diagram of a gating module coupled to components of the lighting system.

Reference is now made to FIG. 2 which provides a high-level illustration of components of the lighting system. In particular, FIG. 2 illustrates a gating module 202, memory 204, luminaire controller 206 and light source(s) 208.

As will be described in more detail below, the gating module 202 and memory 204 may be located on the user terminal 106. In this implementation the luminaire controller 206 and light source(s) 208 may be located on a single luminaire 104 (that is, there is one luminaire controller 206 per luminaire 104). Alternatively the light source(s) 208 may be distributed over a plurality of luminaires 104. In this scenario, the plurality of luminaires 104 may be under the control of a single luminaire controller 206 or a plurality of luminaire controllers 206. The luminaire controller(s) 206 may be located on one of the plurality of luminaires 104 or on one or more network entity (e.g. server) in the lighting network 102.

In other embodiments the gating module and memory 204 may be located in the lighting network 102. In this implementation the gating module 202, memory 204, luminaire controller 206, and the light source(s) 208 may be implemented on a single luminaire 104 (that is, there is one luminaire controller 206 per luminaire 104). Alternatively, the gating module 202 and memory 204 may be implemented on a network entity (e.g. server) in the lighting network 102, and the light source(s) 208 may be distributed over one or more luminaires 104. In this scenario, the network entity may comprise the luminaire controller 206 (a single luminaire controller 206 for all luminaires 104). Alternatively a plurality of luminaire controllers 206 implemented on one or more network entity in the lighting network 102 may be used to control the luminaires 104, each luminaire controller 206 for controlling one or more of the luminaires 104.

As shown in FIG. 2, in embodiments of the present invention, the gating module 202 is arranged to receive sensor data that is obtained by a sensor module of the user terminal 106, and is also arranged to receive an input "sanity check" signal. This input signal is described in more detail with reference to particular embodiments described below. In general terms, the input sanity check signal provides a way to determine whether reliable sensor data can be obtained from a sensor module on user terminal 106.

The gating module 202 is coupled to the memory 204 which is arranged to store predetermined rules defining when the received sensor data should be transmitted to the luminaire controller 206 for controlling the light source(s) 208. The gating module 202 may supply the sensor data to the luminaire controller 206 to control the light emitted by the light source(s) 208. For example to control a lighting parameter e.g. an intensity, colour, saturation, colour temperature, size, shape, pattern, and/or dynamics of the light emitted by the light source(s) 208. Alternatively or additionally, the luminaire controller 206 may use the sensor data to control the operation of the luminaire(s) 104 in other ways that would be apparent to persons skilled in the art. For example the luminaire controller 206 may use the sensor data to control the operations of one or more integrated sensors on the luminaire(s) 104 such as switching on/off the integrated sensors for energy saving purposes.

The gating module 202 is configured to determine based on the input signal and the predetermined rules stored in memory 204 whether the received sensor data should be transmitted to the luminaire controller 206 for controlling the light source(s) 208.

If the gating module 202 determines that the received sensor data should be transmitted to the luminaire controller 206 for controlling the light source(s) 208, it acts accordingly and transmits the sensor data to the luminaire controller 206 for controlling the light source(s) 208, otherwise the sensor data is not transmitted to the luminaire controller 206 for controlling the light source(s) 208.

The functionality of the gating module 202 that is described herein may be implemented in code (software) stored on a memory comprising one or more storage media, and arranged for execution on a processor comprising on or more processing units. The code is configured so as when fetched from the memory and executed on the processor to perform operations in line with embodiments discussed below. Alternatively it is not excluded that some or all of the functionality of the gating module 202 is implemented in dedicated hardware circuitry, or configurable hardware circuitry like a field-programmable gate array (FPGA).

Figure 3:
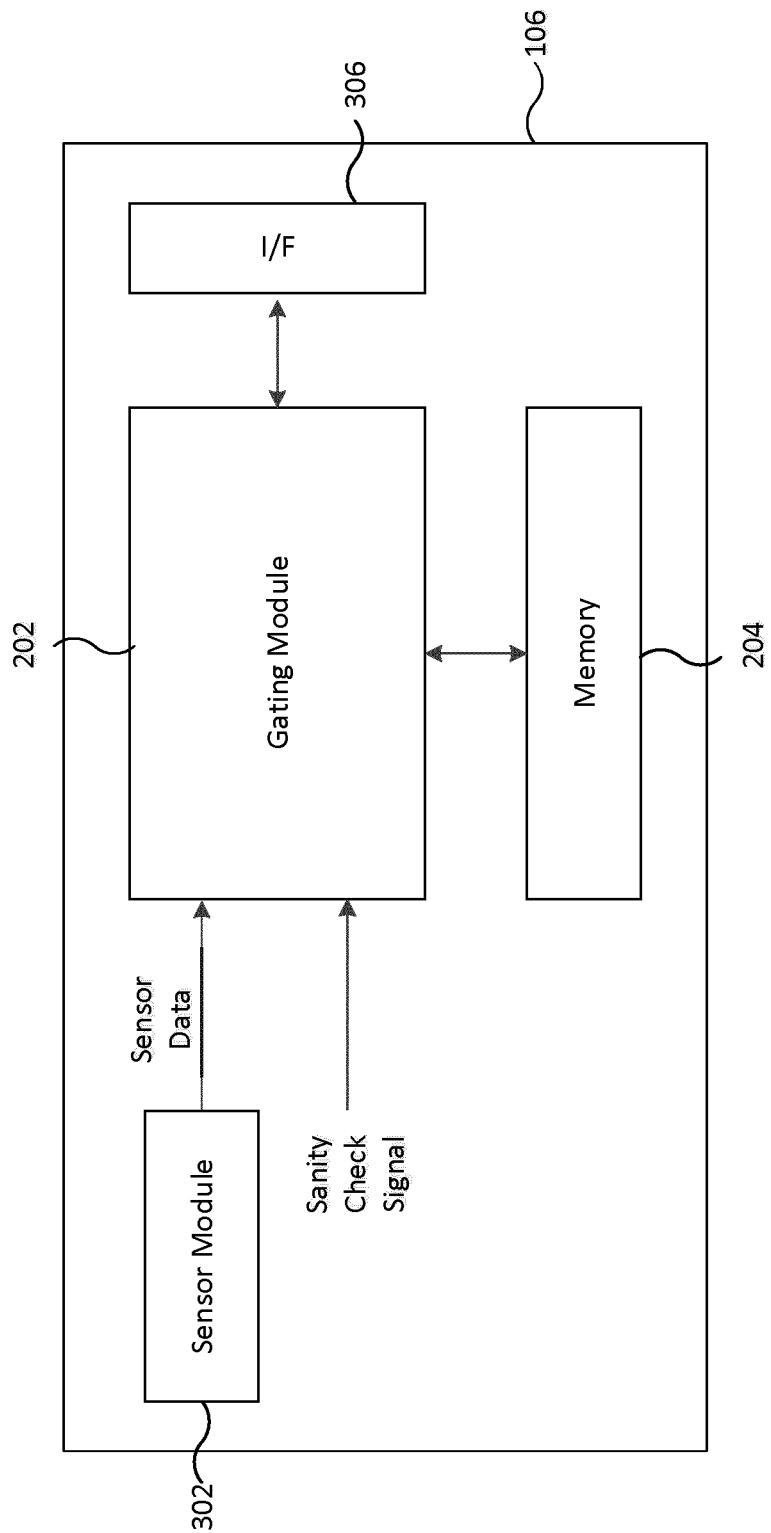
FIG. 3 illustrates a schematic diagram of a user terminal comprising the gating module.

Embodiments of the present invention are first described with reference to FIG. 3 which illustrates a schematic block diagram of user terminal 106 comprising the gating module 202 and memory 204. It will be appreciated that the user terminal will have other components not shown in FIG. 3.

The user terminal 106 comprises a sensor module 302 comprising at least one sensor. The sensor(s) may comprise one or more of a temperature sensor for sensing a temperature in the environment 100, a humidity sensor for sensing a humidity level in the environment 100, a pressure sensor for sensing atmospheric pressure in the environment 100, a microphone (providing an output of a noise/dB level or wind-speeds for instance), an air-quality sensor (particles, smoke, etc.) for sensing the quality of the air in the environment 100, a camera for capturing images of the environment 100, an ambient light sensor, a touch sensor, a proximity sensor (e.g. to the measure distance of head/ears/hands of a user to a display of the user terminal 106), a 3D/range image sensor, a passive infra-red (PIR) sensor, and sensors for sensing the orientation and/or movement of the user terminal 106 for example a gyroscope, accelerometer and/or a magnetometer. The sensor module may comprise other sensors not referred to herein that would be known to persons skilled in the art.

The camera referred to above may be a 'rolling shutter' type camera, which is often integrated into a user terminal like a mobile phone or tablet. In a rolling-shutter camera, the camera's image capture element is divided into a plurality of lines (typically horizontal lines, i.e. rows) which are exposed in sequence line-by-line. In alternative embodiments the camera is a 'global shutter' type camera (where the whole pixel array of the image sensor is exposed at once). Persons skilled in the art will appreciate that coded light can be detected using both the 'rolling shutter' type camera and 'global shutter' type camera.

The sensor module 302 is coupled to the gating module 202 such that sensor data output from the sensor module 302 is supplied to the gating module 202. As shown in FIG. 3, the gating module 202 is also arranged to receive an input "sanity check" signal.

If the gating module 202 determines (based on the input signal and the predetermined rules stored in memory 204) that the received sensor data should be transmitted to the luminaire controller 206 for controlling the luminaire(s) 104, it acts accordingly and transmits the sensor data via interface 306 to the luminaire controller 206 for controlling the luminaire(s) 104, otherwise the sensor data is not transmitted. Interface 306 may be a wired and/or wireless communication interface in dependence on the connection 110 described above.

In one embodiment a luminaire 104 transmits an indication of a lighting characteristic of the light emitted from the light source(s) of the luminaire 104 to the user terminal 106 which is received via interface 306. The lighting characteristic is stored in memory 204. For example, the lighting characteristic may comprise a parameter (e.g. an intensity or range of intensities) of the light emitted by the luminaire 104 or an identifier that is embedded in the light emitted by the light source(s) of the luminaire 104 using coded light techniques.

Coded light refers to techniques whereby data is embedded in the light emitted by a light source. To do this, the light is modulated at a certain modulation frequency or frequencies, preferably a high enough frequency so as to be beyond human perception and therefore not affecting the primary illumination function. However in some cases, a coded light emitter might not have an illumination function at all, in this case, light not visible to humans (e.g. invisible infra-red light) is used as the medium for transmitting the identifying information.

In this embodiment, the memory 204 is configured to store rules which define that sensor data should only be transmitted to the luminaire controller 206 for controlling by the luminaire 104, when predefined light characteristics are detected by the user terminal 106.

In the example whereby the lighting characteristic comprises a value of a parameter (e.g. intensity) of the light emitted by the luminaire 104, the rules may define a threshold range associated with values of the parameter that if detected should result in sensor data being transmitted to the luminaire controller 206. For example, if the luminaire 104 transmits an indication that the light emitted by the luminaire is at an intensity of 500 lux, the rules stored in memory 204 may define for example that sensor data should only be transmitted to the luminaire controller 206 if the user terminal 106 detects light in the environment 100 between, say, 450-550 lux.

In the example whereby the lighting characteristic comprises an identifier that is embedded in the light emitted by the light source(s) of the luminaire 104, the rules stored in memory 204 may define that sensor data should only be transmitted to the luminaire controller 206 if the user terminal 106 detects light in the environment 100 having this identifier embedded into it.

The rules stored in memory 204 may be generated by the gating module 202 in response to reception of the lighting characteristic of the light emitted from the light source(s) of the luminaire 104 that is transmitted from the luminaire 104 to the user terminal 106. Alternatively, the rules may be transmitted from the luminaire 104 together with the lighting characteristic to the user terminal 106 for storage in memory 204.

Illumination in the environment 100 of the user terminal 106 can be detected using a camera and/or ambient light sensor. The camera and/or ambient light sensor are configured to provide a sanity check signal as an input to the gating module 202. The sanity check signal may for example comprise an indication of the intensity of light detected by the camera and/or ambient light sensor or an indication of any identifier(s) decoded by the camera from the light received by the camera.

Using the sanity check signal and the predetermined rules stored in memory 204, the gating module 202 is configured to determine whether the user terminal 106 can detect the light emitted by the luminaire 104. For example if the detected light intensity is within a threshold light intensity range or if the camera has detected an identifier encoded into the light emitted by the luminaire 104.

If the gating module 202 determines that the user terminal 106 can detect the light emitted by the luminaire 104 it can infer that the user terminal 106 is situated in the environment 100 such that reliable sensor data can be obtained e.g. the user terminal 106 is not situated in a pocket of the user 108 (e.g. close to his body) or being kept in the user's bag.

In response to this determination, the gating module 202 is configured to transmit sensor data (e.g. humidity, temperature, pressure or other sensor data) received from sensor module 302 via interface 306 to the luminaire controller 206 for controlling the luminaire 104. This determination may trigger the initiation of sensor data being transmitted from user terminal 106 to luminaire controller 206, or allow transmission of sensor data being transmitted from user terminal 106 to luminaire controller 206 to continue.

If the gating module 202 determines that the user terminal 106 cannot detect the light emitted by the luminaire 104 it can infer that the user terminal 106 is situated in the environment 100 such that reliable sensor data cannot be obtained e.g. the user terminal 106 is situated in a pocket of the user 108 (e.g. close to his body) or being kept in the user's bag.

In response to this determination, the gating module 202 is configured to not transmit sensor data received from sensor module 302 via interface 306 to the luminaire controller 206 for controlling the luminaire 104. This determination may prevent the initiation of sensor data being transmitted from user terminal 106 to luminaire controller 206, or block transmission of sensor data that was already being transmitted from user terminal 106 to luminaire controller 206.

In a further embodiment, a luminaire 104 transmits an indication of environmental conditions in the environment 100 sensed by the luminaire 104 to the user terminal 106 which is received via interface 306. Values of the sensed environmental conditions are stored in memory 204.

In this embodiment, the memory 204 is configured to store rules which define that sensor data should only be transmitted to the luminaire controller 206 for controlling the luminaire 104, when the sensed values of the environmental conditions by a sensor (of the sensor module 302) on the user terminal 106 are within a threshold range. Temperature is one example of an environmental condition of the environment 100.

For example, if the luminaire 104 transmits an indication that the temperature sensed by the luminaire 104 is 20° C., the rules stored in memory 204 may define for example that sensor data should only be transmitted to the luminaire controller 206 if the user terminal 106 detects a temperature in the environment 100 of between 15-25° C.

The rules stored in memory 204 may be generated by the gating module 202 in response to reception of the temperature sensed by the luminaire 104 that is transmitted from the luminaire 104 to the user terminal 106. Alternatively, the rules may be transmitted from the luminaire 104 together with the sensed temperature to the user terminal 106 for storage in memory 204.

Temperature in the environment 100 of the user terminal 106 can be detected using a temperature sensor. The temperature sensor is configured to provide a sanity check signal as an input to the gating module 202. The sanity check signal comprises an indication of the temperature in the environment 100 of the user terminal 106 sensed by the temperature sensor.

Using the sanity check signal and the predetermined rules stored in memory 204, the gating module 202 is configured to determine whether the user terminal 106 is sensing the same temperature as the luminaire 104 (within a certain tolerance).

If the gating module 202 determines that the user terminal 106 is sensing the same temperature as the luminaire 104 it can infer that the user terminal 106 is situated in the environment 100 such that reliable sensor data can be obtained e.g. the user terminal 106 is not situated in a pocket of the user 108 (e.g. close to his body) or being kept in the user's bag.

In response to this determination, the gating module 202 is configured to transmit sensor data (e.g. humidity, pressure or other sensor data) received from sensor module 302 via interface 306 to the luminaire controller 206 for controlling the luminaire 104. This determination may trigger the initiation of sensor data being transmitted from user terminal 106 to luminaire controller 206, or allow transmission of sensor data being transmitted from user terminal 106 to luminaire controller 206 to continue.

If the gating module 202 determines that the temperature sensed by the temperature sensor on the user terminal 106 is outside the predetermined threshold temperature range it can infer that the user terminal 106 is situated in the environment 100 such that reliable sensor data cannot be obtained e.g. the user terminal 106 is situated in a pocket of the user 108 (e.g. close to his body) or being kept in the user's bag.

In response to this determination, the gating module 202 is configured to not transmit sensor data received from sensor module 302 via interface 306 to the luminaire controller 206 for controlling the luminaire 104. This determination may prevent the initiation of sensor data being transmitted from user terminal 106 to luminaire controller 206, or block transmission of sensor data that was already being transmitted from user terminal 106 to luminaire controller 206.

Whilst the embodiment has been described above with reference to temperature, the embodiments extends to other environmental conditions of the environment 100.

For example, the rules stored in memory 204 may define that sensor data should only be transmitted to the luminaire controller 206 for controlling the luminaire 104, when the pressure sensed by a pressure sensor (of the sensor module 302) on the user terminal 106 is within a threshold range. The pressure sensor is configured to provide a sanity check signal as an input to the gating module 202. The sanity check signal comprises an indication of the pressure in the environment 100 of the user terminal 106 sensed by the pressure sensor. Alternatively or additionally, the rules stored in memory 204 may define that sensor data should only be transmitted to the luminaire controller 206 for controlling the luminaire 104, when the humidity sensed by a humidity sensor (of the sensor module 302) on the user terminal 106 is within a threshold range. The humidity sensor is configured to provide a sanity check signal as an input to the gating module 202. The sanity check signal comprises an indication of the humidity in the environment 100 of the user terminal 106 sensed by the humidity sensor.

In a further embodiment the memory 204 is configured to store rules which define that sensor data should only be transmitted to the luminaire controller 206 for controlling the luminaire 104, when the user terminal 106 is positioned to have a certain orientation e.g. when the device is flat (horizontal/vertical).

The orientation of the user terminal 106 can be detected using an inertial sensor of the sensor module 302 such as a gyroscope and/or an accelerometer and/or a magnetometer. The inertial sensor is configured to provide a sanity check signal as an input to the gating module 202. The sanity check signal comprises an indication of the orientation of the user terminal 106 in the environment 100 sensed by the inertial sensor.

Using the sanity check signal and the predetermined rules stored in memory 204, the gating module 202 is configured to determine whether the user terminal 106 is positioned to have an orientation corresponding to a predetermined orientation stored in memory 204.

If the gating module 202 determines that the user terminal 106 has an orientation corresponding a predetermined orientation stored in memory 204, it can infer that the user terminal 106 is situated in the environment 100 such that reliable sensor data can be obtained e.g. the user terminal 106 is on a flat surface and not moving within the environment 100.

In response to this determination, the gating module 202 is configured to transmit sensor data (e.g. humidity, pressure or other sensor data) received from sensor module 302 via interface 306 to the luminaire controller 206 for controlling the luminaire 104. This determination may trigger the initiation of sensor data being transmitted from user terminal 106 to luminaire controller 206, or allow transmission of sensor data being transmitted from user terminal 106 to luminaire controller 206 to continue.

If the gating module 202 determines that the user terminal 106 does not have an orientation that corresponds to a predetermined orientation stored in memory 204, it can infer that the user terminal 106 is situated in the environment 100 such that reliable sensor data cannot be obtained. In response to this determination, the gating module 202 is configured to not transmit sensor data received from sensor module 302 via interface 306 to the luminaire controller 206 for controlling the luminaire 104. This determination may prevent the initiation of sensor data being transmitted from user terminal 106 to luminaire controller 206, or block transmission of sensor data that was already being transmitted from user terminal 106 to luminaire controller 206.

In a further embodiment the memory 204 is configured to store rules which define that sensor data should only be transmitted to the luminaire controller 206 for controlling the luminaire 104, when the user terminal 106 is in a power charging (e.g. wireless or wired charging) state.

The user terminal 106 may comprise a power charging state monitoring module (not shown in FIG. 3) which is configured to output a sanity check signal which indicates whether the power supply (not shown in FIG. 3) of the user terminal 106 is in a charging state such the power supply of the user terminal 106 is being charged.

If the gating module 202 determines that the user terminal 106 is in a power charging state it can infer that the user terminal 106 is situated in the environment 100 such that reliable sensor data can be obtained e.g. the user terminal 106 is not situated in a pocket of the user 108 (e.g. close to his body) or being kept in the user's bag.

In response to this determination, the gating module 202 is configured to transmit sensor data (e.g. humidity, temperature, pressure or other sensor data) received from sensor module 302 via interface 306 to the luminaire controller 206 for controlling the luminaire 104. This determination may trigger the initiation of sensor data being transmitted from user terminal 106 to luminaire controller 206, or allow transmission of sensor data being transmitted from user terminal 106 to luminaire controller 206 to continue.

If the gating module 202 determines that the user terminal 106 is not in a power charging state it can infer that the user terminal 106 is situated in the environment 100 such that reliable sensor data cannot be obtained e.g. the user terminal 106 is situated in a pocket of the user 108 (e.g. close to his body) or being kept in the user's bag.

In response to this determination, the gating module 202 is configured to not transmit sensor data received from sensor module 302 via interface 306 to the luminaire controller 206 for controlling the luminaire 104. This determination may prevent the initiation of sensor data being transmitted from user terminal 106 to luminaire controller 206, or block transmission of sensor data that was already being transmitted from user terminal 106 to luminaire controller 206.

In a further embodiment the memory 204 is configured to store rules which define that sensor data should only be transmitted to the luminaire controller 206 for controlling the luminaire 104, when the user terminal 106 is within a predetermined distance from the luminaire 104.

The user terminal 106 may comprise a location module (not shown in FIG. 3) which is configured to output a sanity check signal which indicates the location of the user terminal 106 in the environment 100.

The location module may use geographic location technology for determining the location of the user terminal 106, in terms of geographic position relative to the surface of the earth; for example, a satellite based positioning system such as GPS (Global Positioning System, including potential variants such as assisted GPS or differential GPS), GLONASS (Global Navigation Satellite System) or Galileo.

Alternatively the location module may determine the location of the user terminal 106 with respect to a location network comprising a plurality of wireless reference nodes, in some cases also referred to as anchor nodes. These anchors are wireless nodes whose locations are known a priori, typically being recorded in a location database which can be queried to look up the location of a node. The anchor nodes thus act as reference nodes for localization. Measurements are taken of the signals transmitted between the mobile device and a plurality of anchor nodes, for instance the RSSI (receiver signal strength indicator), ToA (time of arrival) and/or AoA (angle of arrival) of the respective signal. Given such a measurement from three or more nodes, the location of the mobile terminal may then be determined relative to the location network using techniques such as trilateration, multilateration or triangulation. Given the relative location of the mobile terminal and the known locations of the anchor nodes, this in turn allows the location of the mobile device to be determined in more absolute terms, e.g. relative to the globe or a map or floorplan.

Other methods which the location module may use for determining the location of the user terminal 106 are well known to persons skilled in the art and are therefore not discussed in detail herein.

Using the known location of the luminaire 104 (which may or may not be an anchor node) which is pre-stored in memory 204 and the sanity check signal which identifies the location of the user terminal 106 in the environment 100, the gating module 202 is able to determine the distance between the user terminal 106 and the luminaire 104.

If the gating module 202 determines that the user terminal 106 is within the predetermined distance from the luminaire 104 (defined in the predetermined rules stored in memory 204) it can infer that the user terminal 106 is situated in the environment 100 such that reliable sensor data can be obtained.

In response to this determination, the gating module 202 is configured to transmit sensor data (e.g. humidity, temperature, pressure or other sensor data) received from sensor module 302 via interface 306 to the luminaire controller 206 for controlling the luminaire 104. This determination may trigger the initiation of sensor data being transmitted from user terminal 106 to luminaire controller 206, or allow transmission of sensor data being transmitted from user terminal 106 to luminaire controller 206 to continue.

If the gating module 202 determines that the user terminal 106 is not within a predetermined distance from the luminaire 104 it can infer that the user terminal 106 is situated in the environment 100 such that reliable sensor data cannot be obtained. That is, due to the location of the user terminal 106 sensor data captured at the user terminal would not be an accurate reflection of conditions observed in the immediate surroundings of the luminaire 104.

In response to this determination, the gating module 202 is configured to not transmit sensor data received from sensor module 302 via interface 306 to the luminaire controller 206 for controlling the luminaire 104. This determination may prevent the initiation of sensor data being transmitted from user terminal 106 to luminaire controller 206, or block transmission of sensor data that was already being transmitted from user terminal 106 to luminaire controller 206.

In a further embodiment, the memory 204 is configured to store a user-defined light control schedule which indicates which types of sensor data is to be supplied to the luminaire controller 206 for controlling the luminaire 104 during different times of the day.

The user terminal 106 may comprise a timer or clock which is configured to output a sanity check signal which indicates the time of day.

In this embodiment, at a particular time of day the gating module 202 is configured to only transmit sensor data which the user-defined light control schedule indicates should be transmitted to the luminaire controller 206 for controlling the luminaire 104 at the specific time of day.

For example, the sensor module 302 may comprise a PIR sensor and the user-defined light control schedule may indicate that sensor data output from the PIR sensor should only be supplied to the luminaire controller 206 during daytime (e.g. between the hours of 7 am and 7 pm). This ensures that only sensor data that is needed by the luminaire controller 206 is supplied to the luminaire controller 206.

Whilst embodiments have been described above with reference to the gating module 202 and memory 204 being located on the user terminal 106. In other embodiments, the gating module 202 and memory 204 may be located on a single luminaire 104, this is illustrated in FIG. 4.

Figure 4:
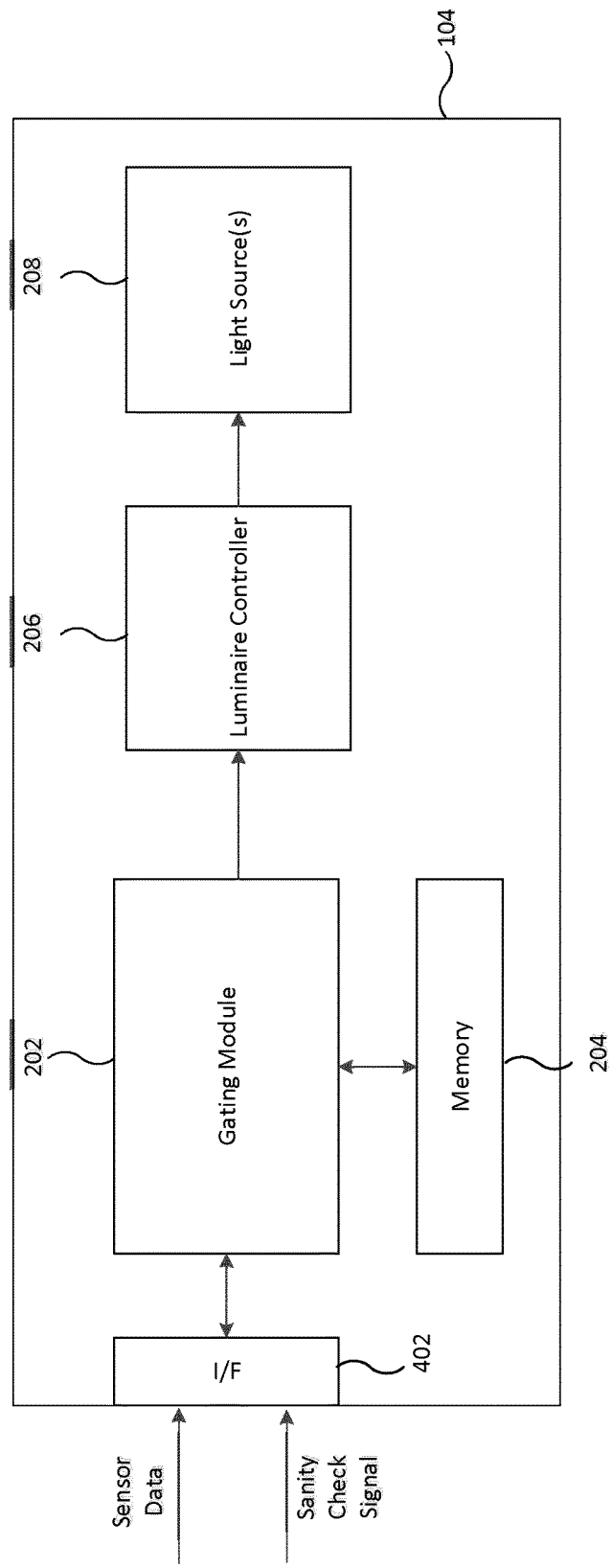
FIG. 4 illustrates a schematic diagram of a luminaire comprising the gating module.

As shown in FIG. 4, the luminaire 104 comprises the gating module 202 and memory 204. Sensor data and the sanity check signal are received from the user terminal 106 via interface 402.

The gating module 202 is operable to behave in the same manner as described above with reference to FIG. 3. That is, in response to the gating module 202 determining that reliable sensor data can be obtained from the sensor module 302 on user terminal 106, the gating module 202 is configured to supply the received sensor data to the luminaire controller 206. Furthermore in response to the gating module 202 determining that reliable sensor data cannot be obtained from the sensor module 302 on user terminal 106, the gating module 202 is configured to not supply the received sensor data to the luminaire controller 206.

In response to the gating module 202 determining that reliable sensor data cannot be obtained from the sensor module 302 on user terminal 106, the gating module 202 may also be configured to transmit a command via interface 402 to the user terminal 102 to tell the user terminal 102 to stop transmitting sensor data. This improves energy efficiency on the user terminal 106. The gating module 202 can reinitiate transmission of sensor data to the luminaire 104 by way of a command via interface 402 to the user terminal 102 based on the sanity check signal and the predetermined rules stored in memory 204

Whilst FIG. 4 shows a single luminaire 104 comprising the light source(s) 208, in other embodiment the light source(s) 208 may be distributed over a plurality of luminaires 104 under the control of the luminaire controller 206 located in the lighting network 102. The luminaire controller may be located on one of these luminaires or may be located on a separate device (e.g. server) entirely in the lighting network 102.

Referring back to FIG. 3 whereby the user terminal 106 comprises the gating module 202 and memory 204.

The luminaire 104 may comprise a passive sensor for sensing motion of a person in the environment 100 and the luminaire controller 206 of the luminaire 104 may be configured to control the light source(s) 208 of the luminaire in response to control signals received from the passive sensor. An example passive sensor is a passive infrared (PIR) sensor which senses the infrared radiation given off by an object such as a person or other being.

PIR sensors have limitations in that if a person enters the field-of-view (FOV) of the PIR sensor, this will trigger the light source(s) 208 of the luminaire to be turned on, but if that person remains in the FOV of the PIR sensor with little movement, if the PIR sensor does not detect movement for a predetermined period of time (e.g. 30 seconds) the luminaire controller 206 will turn the light source(s) 208 off.

Sensors of the sensor module 302 for sensing the movement of the user terminal 106 for example a gyroscope, accelerometer and/or a magnetometer are particularly sensitive to motion. For example the presence of a user 108 at a desk in the FOV of the PIR sensor who is remaining still may not be detected by the PIR sensor, but if the user terminal 106 was located in the user's pocket any minor movement by the user 108 would be detected by the movement sensor(s) on the user terminal 106. Thus this sensor data is useful in the decision process performed by the luminaire controller 206 of the luminaire 104 to determine whether to turn the light source(s) 208 off following motion detection. However it is not energy-efficient to continually transmit this sensor data from the user terminal 106 to the luminaire controller 206.

In a further embodiment the memory 204 on the user terminal 106 is configured to store rules which define that sensor data should only be transmitted to the luminaire controller 206 for use in the decision process to determine whether a person is present in the FOV of the PIR sensor when the user terminal 106 receives a message (sanity check signal) via interface 306 from the luminaire 104 which indicates that the PIR hasn't detected movement in the FOV of the PIR sensor for a predetermined period following motion detection.

In this embodiment the gating module 202 is configured to only transmit sensor data (e.g. gyroscope, accelerometer and/or a magnetometer data) received from sensor module 302 via interface 306 to the luminaire controller 206 for use in the decision process to determine whether a person is present in the FOV of the PIR sensor, in response to receiving this message.

This allows the luminaire controller 206 to delay the decision to turn off the light source(s) 208 by confirming the condition using a different sensing modality.

Once the luminaire controller 206 has used the sensor data to make the decision it may be operable to communicate with the user terminal 106 to stop further transmission of sensor data.

In addition or as an alternative to sensor data output by motion sensors of the user terminal 106 being gated by the gating module 202, other sensor data (indicative of user activity) can be transmitted to the luminaire controller 106 to confirm whether or not a person is present in the FOV of the PIR sensor by the gating module 202 in response to receiving the message described above. For example, a microphone signal output by a microphone of the user terminal 106 and/or signals indicative of detected graphical user interface (GUI) interaction may be gated by the gating module 202 and/or location information output by the location module of the user terminal 106 referred to above.

In accordance with embodiments presented above the sensor platform on the user terminal 106 may be prevented from continuously broadcasting its sensor information to the lighting network 102. This improves energy efficiency on the user terminal 106.

It will be apparent from the embodiments described above that the present invention is not limited to the lighting network 102 initiating the information exchange protocol. IoT devices can have applications residing on them that initiate information broadcast themselves (for instance, only when they are charged/powered or transmission of location information).

The gating module 202 may receive sensor data that is output from a plurality of sensors of the sensor module 302. In the embodiments described above, the gating module 202 may use the sanity check signal and the predetermined rules stored in memory 204 to determine whether the sensor data received from all of the plurality of sensors of the sensor module should be supplied to the luminaire controller(s) 206 for controlling the luminaire(s) 104. Alternatively, the gating module 202 may perform the gating on sensor data that is received from only one or more of the plurality of sensors of the sensor module 302, and transmit the sensor data received from the remaining sensors of the plurality of sensors to the luminaire controller(s) 206 regardless without taking into account the sanity check signal.

It will be appreciated that the above embodiments have been described only by way of example.

Whilst embodiments have been described above with reference to the sensor module 302 being implemented on the user terminal 106. In some embodiments, the sensor module 302 may not be implemented on the user terminal 106. For example, the sensor module 302 may be implemented on other devices such as a stand-alone sensor hub that is connected via a wired or wireless connection to the luminaire 104. Alternatively, a plug'n'play module that is arranged to be coupled to the luminaire 104 may comprise the sensor module 302. In another example, the sensor module 302 may be embedded into the luminaire 104 itself.

In the embodiments described above, the gating module 202 may be provided with further functionality in addition to gating data transfers. In particular, in response to determining that sensor data output from one or more sensor of sensor module 302 is not to be supplied to the luminaire controller 206, the gating module may be configured to control operation of the one or more sensor. This may include switching the one or more sensor off or placing the one or more sensor into a sleep mode (low power consumption state) for a predetermined period of time, or changing the measurement frequency of the one or more sensor.

Whilst embodiments have been described above with reference to a single sensor module 302, the gating module 202 may receive sensor data output from a plurality of sensor modules located in the environment 100, each sensor module comprising one or more sensor. For example a sensor module may be present in each of the user terminal 106, a stand-alone sensor hub, and the luminaire 104.

In embodiments where the gating module 202 receives sensor data output from a plurality of sensor modules located in different areas in the environment 100 (e.g. in different rooms of a building), and the sanity check signal indicates the location of the user terminal 106 in the environment 100, in response to determining that the user terminal 106 is within a predetermined distance from a luminaire located in one area of the environment, the gating module 202 may be configured to control operation of sensor modules coupled (wired or wireless) to the gating module 202 that are not located in the area where the user terminal 106 is located, this may include switching the sensor(s) of these sensor modules off or placing the one or more sensor into a sleep mode (low power consumption state) for a predetermined period of time, or changing the measurement frequency of these sensor modules. Thus the gating module 202 is then only operable to perform a gating decision on sensor data received from a sensor module that is located where the user terminal 106 is located.

In embodiments where the gating module 202 receives sensor data output from a plurality of sensor modules, it will be appreciated that the gating module 202 may receive a particular type of sensor data that is output from each of the plurality of sensor modules. It will be appreciated that for particular types of sensor data (e.g. temperature, humidity, atmospheric pressure, air quality) the sensor data that is output from each of the plurality of sensor modules will be the same. In embodiments, the gating module 202 is configured to monitor the bandwidth of the data transmission of sensor data to the luminaire controller 206. In particular, in response to detecting that the transmission of sensor data to the luminaire controller 206 has exceeded a predetermined bandwidth threshold, if the sensor data that is to be transmitted to the luminaire controller 206 includes a type of sensor data that is received from multiple sensor modules, the gating module 202 is configured to only transmit the type of sensor data that is received from a subset of the multiple sensor modules.

For example four sensor modules may provide temperature data (or other global sensor data) to the gating module 202. In response to detecting that the transmission of sensor data to the luminaire controller 206 has exceeded a predetermined bandwidth threshold, the gating module 202 may be configured to only transmit the temperature data that is received from a subset of the four sensor modules (e.g. from one to three of the four sensor modules) to reduce the bandwidth usage of the data transfer. As temperature is a type of global sensor data (all sensor modules located in the same environment will provide the same measurements) rather than local sensor data (unique to the particular device on which the sensor module is located), this reduction in the amount of temperature data sent to the luminaire controller 206 is not detrimental to the control of the light source(s) 208.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The terms "controller" and "module" as used herein generally represent software, firmware, hardware, or a combination thereof. In the case of a software implementation, the controller or module represents program code that performs specified tasks when executed on a processor (e.g. CPU or CPUs). The program code can be stored in one or more computer readable memory devices. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A gating module for use in a lighting system, the lighting system comprising at least one sensor module, the at least one sensor module comprising at least one sensor, and a lighting network comprising at least one luminaire, the gating module configured to:
    receive sensor data obtained by the at least one sensor module;
    receive an input signal;
    determine, based on the input signal and predetermined rules stored in a memory, which parts of the sensor data are to be supplied to at least one luminaire controller for use in controlling the at least one luminaire; and
    only supply the determined parts of the sensor data to the at least one luminaire controller,
    wherein the input signal indicates an orientation of a device associated with a sensor module of the at least one sensor module, and the predetermined rules indicate transmission of sensor data to the luminaire controller only when the device is positioned in a predetermined orientation.

2. The gating module of claim 1, wherein the input signal comprises at least one characteristic of light detected by a sensor of the at least one sensor module, and the predetermined rules define which parts of the sensor data should only be transmitted to the luminaire controller when predetermined light characteristics are detected by said at least one sensor module.

3. The gating module of claim 2, wherein the at least one light characteristic comprises one or more of:
an intensity of light detected by the sensor, and the predetermined rules define sensor data should only be transmitted to the luminaire controller when the detected intensity is within a predetermined threshold intensity range; and
an identifier decoded by the sensor from light received by said sensor, and the predetermined rules define sensor data should only be transmitted to the luminaire controller when the sensor detects light having a predetermined identifier embedded into it.

4. The gating module of claim 1, wherein the input signal is indicative of an environmental condition of an environment of a device on which a sensor module of the at least one sensor module is implemented, and the predetermined rules define sensor data received from said sensor module should only be transmitted to the luminaire controller when sensed values of the environmental condition are within a predetermined threshold range.

5. The gating module of claim 1, wherein the input signal comprises an indication as to whether a power supply of a device on which a sensor module of the at least one sensor module is implemented is in a charging state, and the predetermined rules define sensor data received from said sensor module should only be transmitted to the luminaire controller when the power supply of the device is in a charging state.

6. The gating module of claim 1, wherein the input signal comprises an indication of a location of a device on which a sensor module of the at least one sensor module is implemented, and the predetermined rules define sensor data received from said sensor module should only be transmitted to the luminaire controller when the device is within a predetermined distance of the at least one luminaire, the gating module configured to perform said determination using known location information of the at least one light source.

7. The gating module of claim 1, wherein the gating module is implemented on a luminaire of the at least one luminaire, the luminaire comprising the luminaire controller and the at least one light source, and the gating module is configured to receive the sensor data via an interface of said luminaire.

8. The gating module of claim 1, wherein the gating module and luminaire controller are implemented on a network entity connected within said lighting network, and the gating module is configured to receive the sensor data via an interface of said network entity, for use in controlling the light emitted by the at least one luminaire coupled to the network entity.

9. The gating module of claim 1, wherein the gating module receives a type of sensor data from a plurality of sensor modules, the gating module further configured to:
detect that the supply of the determined parts of the sensor data to the at least one luminaire controller has exceeded a predetermined bandwidth threshold; and
in response to said detection, only supply the type of sensor data that is received from a subset of the plurality of sensor modules.

10. The gating module of any of claim 1, wherein the gating module is implemented on a user terminal comprising the at least one sensor module, and is configured to supply the sensor data to the luminaire controller that is connected within said lighting network, over a connection via an interface of said user terminal.

11. The gating module of claim 10, wherein the predetermined rules define sensor data should only be transmitted to the luminaire controller upon reception of an input signal comprising an indication that a motion sensor on the at least one luminaire has not detected movement in a sensing region of the motion sensor for a predetermined period following motion detection, and the gating module is configured to perform said determination upon reception of said input signal.

12. The gating module of claim 1, wherein in response to determining that sensor data output from one or more sensor of the at least one sensor module is not to be supplied to the luminaire controller, the gating module is configured to control operation of the one or more sensor.

13. A method performed by gating module implemented in a lighting system comprising at least one sensor module each sensor module comprising at least one sensor and a lighting network comprising at least one luminaire, the method comprising:
receiving sensor data obtained by the at least one sensor module;
receiving an input signal;
determining based on the input signal and predetermined rules stored in a memory which parts of the sensor data are to be supplied to at least one luminaire controller for use in controlling the at least one luminaire; and
only supplying the determined parts of the sensor data to the at least one luminaire controller,
wherein the input signal indicates an orientation of a device associated with a sensor module of the at least one sensor module, and the predetermined rules indicate transmission of sensor data to the luminaire controller only when the device is positioned in a predetermined orientation.

14. A computer program product for controlling transmission of sensor data to a lighting network comprising at least one luminaire, the computer program product comprising code embodied on a non-transitory computer-readable medium and being configured so as when executed on a processor to:
receive sensor data obtained by at least one sensor module;
receive an input signal;
determine, based on the input signal and predetermined rules stored in a memory, which parts of the sensor data are to be supplied to at least one luminaire controller for use in controlling the at least one luminaire; and
only supply the determined parts of the sensor data to the at least one luminaire controller, wherein
the input signal indicates an orientation of a device associated with a sensor module of the at least one sensor module, and the predetermined rules indicate transmission of sensor data to the luminaire controller only when the device is positioned in a predetermined orientation.

* * * * *